United States Patent [19]
Webster

[11] 4,180,937
[45] Jan. 1, 1980

[54] ELECTRICAL ANIMAL SNARE

[76] Inventor: Jady Webster, 339 W. College, Lewisville, Tex. 75067

[21] Appl. No.: 911,436

[22] Filed: Jun. 1, 1978

[51] Int. Cl.$^2$ ............................................. A01M 23/00
[52] U.S. Cl. ......................................................... 43/87
[58] Field of Search ................................ 43/85, 86, 87

[56] References Cited

U.S. PATENT DOCUMENTS

| | | | |
|---|---|---|---|
| 1,052,398 | 2/1913 | Woods | 43/87 |
| 1,738,907 | 12/1929 | Kleffman | 43/87 |
| 2,458,176 | 1/1949 | Jones | 43/87 |
| 2,696,063 | 12/1964 | Hounsell | 43/87 |
| 3,060,623 | 10/1962 | Aldrich | 43/87 |
| 3,276,159 | 10/1966 | Robards | 43/87 X |
| 3,958,360 | 5/1976 | King | 43/87 |
| 3,967,408 | 7/1976 | Aberg | 43/87 |
| 4,069,612 | 1/1978 | King | 43/87 |

Primary Examiner—Nicholas P. Godici
Attorney, Agent, or Firm—Crisman & Moore

[57] ABSTRACT

A snare type animal trap actuatable by a solenoid trigger mechanism having a plurality of sensor elements interconnected with a plurality of snares. The trigger mechanism includes a spring biased T-bar structure over which a snare loop is disposed and triggered by an electrical sensor or switch. The T-bar structure is actuated by the movement of a solenoid which is responsive to said switch disposed in the vicinity of the snare loop. Conventional bait such as animal scent is utilized for urging the animal into the snare loop, or noose, for actuation of the trigger. A backup or secondary trigger mechanism is also incorporated wherein the bait is tied to a mechanical trigger associated with the T-bar structure. In this manner, a plurality of bait and noose elements may be disposed relative to a single trigger structure and operated by a single spring element. Such a construction permits the utilization of a single trap for multiple types of bait and bait locations and provides for animal entrapment in a manner not inhumane to the animal.

9 Claims, 3 Drawing Figures

ELECTRICAL ANIMAL SNARE

BACKGROUND OF THE INVENTION

This invention relates to an animal trap and, more particularly, to a snare trap acuatable by an electric solenoid triggered by one of a plurality of circuit switches disposed in the vicinity of the noose.

It is conventionally the practice in animal trapping throughout the North and South American continents to use various embodiments of mechanical animal traps. Such mechanical apparatus includes traps which ensnare the whole body of the animal entering therein. Such traps also include pincer structures having jaws or the like for snapping about the limbs or body of the animal. The pincer configuration is particularly popular for foxes and like animals because of the reliability aspects thereof. The pincer traps however have the disadvantage of hurting a trapped animal by subjecting it to great pain and/or dismemberment. For this reason, the utilization of pincer traps for foxes and the like has been prohibited by law in certain areas of the country.

Other prior art configurations of animal traps include conventional rope snares and cages. Cage traps are generally constructed to receive the entire body of the animal behind which the door of the cage slams shut, the slamming actuation being triggered by the entry of the animal therein. Rope snares are utilized in conjunction with resilient spring mechanisms to withdraw the rope and snare about the animal to entrap it. The rope snare variety of traps is perhaps one of the oldest trap configurations known to man. Although the rope snare embodiment is antiquated in its genesis it provides a reliable, relatively humane, manner of trapping animals. For that reason, numerous structures have been developed for the utilization of such snare mechanisms within the prior art. For example, U.S. Pat. No. 3,967,408 issued on July 6, 1976, to Jan Aberg of Sweden, sets forth and discloses such an humane animal snare mechanism. In the Aberg patent a tubular body is provided with a spring mechanism actuatable upon an elongated filament to ensnare an animal triggering said trap. Such a snare mechanism has the object of providing a trap which is very considerate for the trapped animal and does not cause great pain and which is as reliable as pincer traps. It is another consideration for such traps that they can be layed directly in snow or tree leaves in an animal runway. Such a trap may be seen to be useful in the entrapment of animals in an humane manner, although limited in the size of the animal that may be trapped as well as in certain other functional aspects.

Other snare trapping devices have been embodied in various prior art patents. For example, U.S. Pat. No. 3,276,159 issued on Oct. 4, 1966 to F. C. Robards discloses a trapping device incorporating a self-propelling mechanism made effective to draw close an open noose layed out on the ground to catch a bird or animal. Similar prior art snare configurations include the following U.S. Patents:

| Patent No. | Issue Date | Inventor |
|---|---|---|
| 3,060,623 | October 30, 1962 | J. R. Aldrich |
| 2,696,063 | December 7, 1954 | J. R. Hounsell |
| 2,592,390 | April 8, 1952 | R. E. Burt |
| 2,200,617 | May 14, 1940 | M. R. Clover |
| 4,069,612 | January 24, 1978 | Lawrence E. King |

As clearly illustrated in the aforesaid prior art patents, the utilization of snares with spring actuated mechanisms is well taught. More recent configurations of such snare embodiments include the King patent wherein a pair of arms are pivoted together at one end and normally urged apart by heavy duty springs at the other. The design considerations of such recent configurations extend to overcoming the disadvantages of bulky trap configurations and traps which are difficult to set because the heavy spring mechanisms. It is also an important aspect of more recent trap constructions to provide a functionally reliable trigger assembly. Of course, the safety and ease in use of the trap is also an important design consideration of which more antiquated pincer type traps and bulky snare type entrapment means provide numerous disadvantages and problems in prior art constructions.

Another aspect of most prior art traps, is the utilization of a single trapping mechanism for each type of bait or trap unit. Beside the disadvantage of such trap mechanisms, most prior art constructions are limited to a single type of bait or to a single trap element wherein an animal may find it easy to evade the trap mechanism due to the limited number of entrapping elements. Further, such traps are effective only to the extent of their inherent reliability, and traps utilizing mechanical actuation mechanisms have proven to be defective under certain environmental conditions.

It would be an advantage therefore to overcome the disadvantages of prior art trap mechanisms by providing an animal trap of the snare variety incorporating a plurality of snare mechanisms actuatable by electronic means for improving versatility and inherent reliability. The animal trap of the present invention provides such a structure wherein a T-bar trigger mechanism incorporates an electrical solenoid actuatable by one of a plurality of electrical sensors disposed in the vicinity of a plurality of snares extending from said single trigger mechanism. In this manner, a plurality of types of bait and bait locations may be incorporated within a single animal trap structure. In addition, such a configuration may be provided for the entrapment of animals of any variety of sizes while maximizing the effectiveness of a single trap unit as compared to such trap devices incorporating only a single bait element.

SUMMARY OF THE INVENTION

The invention relates to the apparatus for use in the trapping of animals such as foxes, or the like, which apparatus includes a spring actuatable trigger mechanism for actuating a plurality of filament snares simultaneously. More particularly, one aspect of the invention includes a T-bar spring biased trigger mechanism incorporating an electrical solenoid in the mechanical latching portion thereof. The solenoid is responsive to one of a plurality of electrical sensors which may be remotely disposed therefrom. A plurality of snare filaments may be provided across the trigger mechanism in the vicinity of said sensors for responsive actuation.

In another aspect, the invention includes the above described apparatus wherein the spring biased mechanism includes a T-bar construction having an upstanding trigger latch abuttingly engaging the solenoid armature of a conventional electronic solenoid device. A suitable remote power supply such as battery is provided upon the T-bar trigger structure base adjacent the solenoid. Electrical communication is effected with a single pole single throw contact device disposed about or within the snare. In this manner, the location of the snare relative to the trigger may be selectively arranged as desired by the trapper.

In yet another aspect of the invention, a secondary or backup triggering mechanism is incorporated by the utilization of a filament connected between a mechanical latch and the bait itself disposed in the vicinity of the loop snare. In this manner, should the animal fail to engage the electrical sensor to actuate the solenoid the engagement of the bait itself will effectively actuate the mechanical latch to engage the spring biasing mechanism to cause entrapment of the animal. It may thus be seen that a plurality of bait types may be utilized, such as animal food tied to the mechanical trigger element and bait animal scent disposed in the vicinity of the electrical contacts. In this manner the exposure of the particular trap to the number of animals possibly trapped thereby it is maximized. It may further be seen that the utilization of a plurality of loop snares with a single triggering mechanism maximizes the efficiency and effectiveness of the trapping unit beyond that of the aforesaid prior art mechanism.

In yet another embodiment of the present invention the trap mechanism may include the securement of one end of the filament snare to a suitable staking device. In this manner, the T-bar actuation member may cause the entrapment of the animal and the disengagement of the particular filament from the trap so that the animal is connected to the staking member rather than the trap itself. In this manner the trap is not damaged during the tussle of the animal with its entrapping element which is common in most prior art configurations.

BRIEF DESCRIPTION OF THE DRAWINGS

For a more complete understanding of the present invention, and for further objects and advantages thereof, reference may be now had to the following description taken in conjunction with the accompanying drawings in which.

DETAILED DESCRIPTION

Figure 1:
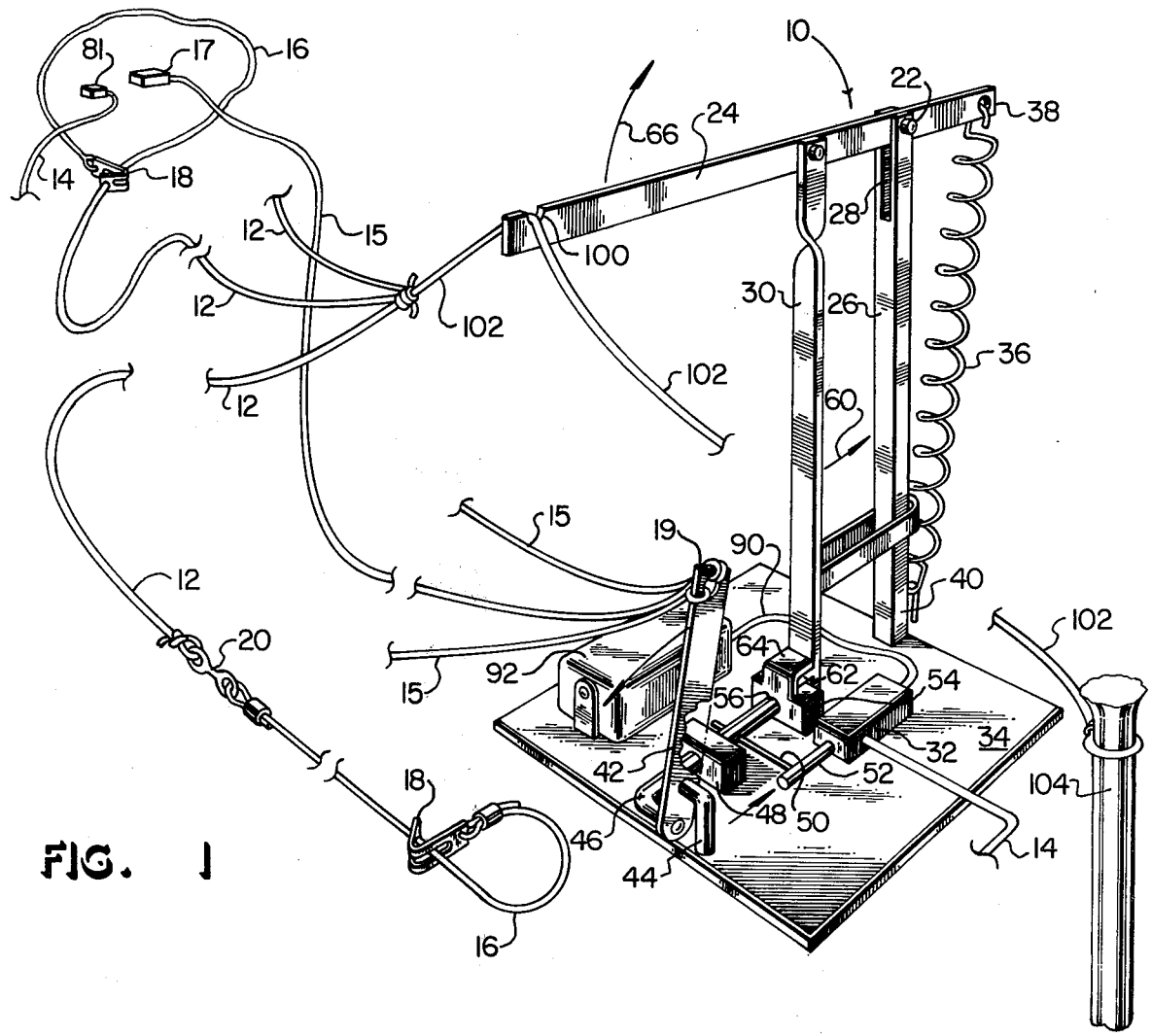
FIG. 1 is a perspective view of an animal trap constructed in accordance with the principles of the present invention, illustrating a plurality of filament snares assembled thereacross.

Referring first to FIG. 1, there is shown one embodiment of an animal trap constructed in accordance with the principles of the present invention. The animal trap of the present invention includes a trigger mechanism 10 having looped thereover a plurality of filament snares 12 for use in conjunction with trigger sensor units 14. Each filament snare 12 includes a rope, wire, or the like and an end portion 16 secured in an adjustable loop configuration with a conventional one way fastener element 18. A swivel 20 interconnects each loop unit 16 with the remaining filament portion 12. In this manner the trigger mechanism 10 may be actuatable in response to the detection of animals through the sensor unit 14 for the snaring of same in an effective and humane manner.

Referring now to the trigger unit 10 of FIG. 1, there is shown a T-bar construction 22 including a generally horizontal snaring arm 24 upstanding from a support strut 26 having a U-shaped upper portion 28 for receiving said crossbar arm therethrough. A downwardly extending lever arm 30 is suspended from the snaring, or crossarm 24 for responsive actuation relative to a solenoid unit 32 disposed upon a support plate 34 therebeneath. The whole trigger assembly 10 is biased by a tensioning element of spring 36 secured to the aft end 38 of the cross arm 24 and the base of the support strut 26 base 40.

The particular animal snare of the present invention utilizes an electrically powered solenoid for the reliable actuation of the trigger mechanism. The utilization of a plurality of filament loops 12 facilitates the use of a wide range of bait types and locations which may be used as well as trap reliability. Further to this design consideration, the trap of the present invention is provided with a mechanical linkage for actuation in conjunction with the electrical solenoid 32 for the spring actuation of the trigger unit 10. An actuation lever 42 is thus provided, pivotally mounted about a forward strut 44 secured to the plate 34 generally centrally thereof and interconnected to said solenoid 32 through an L-shaped arm member 46 slidably mounted in a support block 48 adjacent a solenoid actuation arm 50 forming an orthogonal element to a solenoid armature member 52. The arm 46 extends rearwardly to a support block 54 and is reciprocally mounted within an aperture 56 formed therein. Rectilinear motion of the arm 46 through the aperture 56 causes abutting engagement with the latch arm 30 and rearward movement in the direction of the arrow 60 causing lateral finger portion 62 of the arm 30 to move rearwardly and out from under bracket 64 of support block 54. This rearward disposition actuated by the solenoid 32 and/or lever arm 42 cause the mechanical release of the pivot arm 24 to the tension of the bias spring 36 for the upward movement in the direction of arrow 66. Upward movement of the arrow 66 of the pivot arm 24 causes the pulling of the loop filaments 12 and the snaring of animals in the vicinity thereof. The sensor lever 42 is connected to suitable bait elements 17 via interconnection sensing filaments 15 such as wire, rope, or the like, secured to the uppermost portion 19 thereof.

Figure 2:
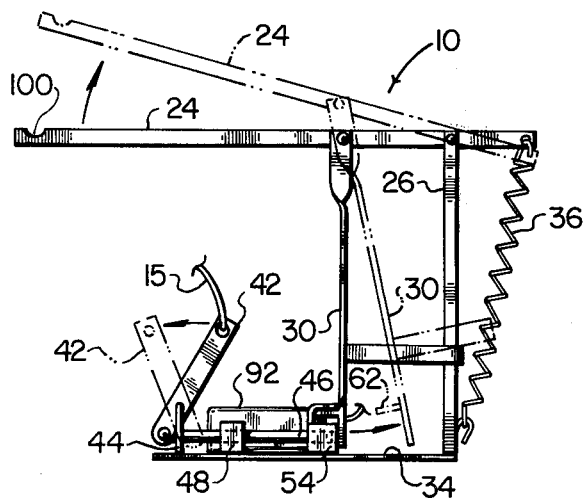
FIG. 2 is a side elevational view of the trigger mechanism of the animal trap of FIG. 1, illustrating the operation thereof.

Referring now to FIG. 2, the tension spring 36 is shown in a biasing configuration relative to the cross arm 24 shown in a first trigger position and again in phantom in an operational, or upwardly moving position. The phantom position of the arm 24 is a mating illustration to the phantom position of the lever arm 42 shown atop plate 34. Similarly, the phantom position of the latch arm 30 illustrates the movement of the respective elements of the trigger unit 10 for the snaring of animals in the loop 16 in response to the detection of said animals in the vicinity thereof.

Figure 3:
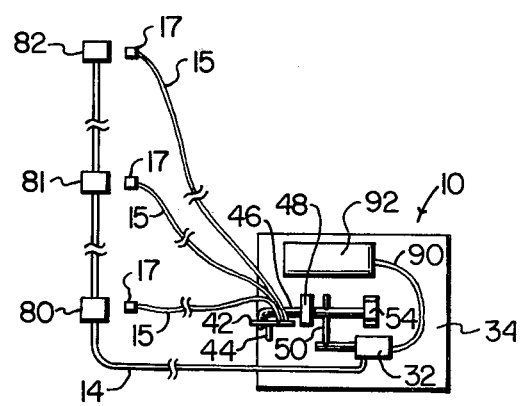
FIG. 3 is a top plan, diagrammatical view of the electro-mechanical system of the present invention.

Referring now to FIG. 3, there is shown a diagrammatical view of the trigger unit 10 of the present invention for purposes of illustrating the detection and sensing of animals in the predesignated vicinities. Support plate 34 is shown in fragmentary top plan view interconnected to the solenoid 32 which is connected in parallel through the electrical network 14 to three separate sensor units 80, 81 and 82. Each of the sensor units, may be comprised of a single pole, single throw switch constructed for actuation under light pressure whereby animals of a relatively small size may be detected. Said sensor units 80, 81, 82 are also preferably connected in parallel so that the detection of any one sensor is sufficient to trigger the solenoid 32. Actuation of the solenoid 32 is translated into mechanical movement through the connecting armature 50 and L-shaped arm 46 extending backwardly through support blocks 48 and 54. A power supply line 90 is shown interconnecting the solenoid 32 to power supply 92 such as a conventional battery shown in FIG. 3 for purposes of illustration.

The specific mechanical configuration of the present invention is a preferred embodiment only. Likewise the electrical and/or schematic illustration thereof is but one workable embodiment facilitating the construction of the apparatus of the present invention. It is the purpose of the present invention to provide a plurality of loop snares which may be disposed relative to the trigger unit and actuated by one of two mechanisms. The first mechanism is the electrical circuit operation utilizing detector units 80, 81 and 82 disposed in the vicinity of the particular filament loop 16. The second mechanism is the mechanical interconnection of lever arm 42. Three or more filament loops of course may be utilized but each is actuated in response to the detection of an animal in any one loop. The present invention further facilitates the utilization of multiple snares by providing a detachable snare engagement atop the pivot arm 24. Referring now to FIG. 1 there is shown a slot 100 in pivot arm 24 carrying the filament line 102 thereacross which interconnects with the several filament lines 12 as discussed above. Actuation of the pivot arm 24 upwardly as illustrated in FIG. 2, in phantom, causes the lifting and tensioning of the respective filament lines 12 and actuation of the respective loops 16 about the animal. Following said actuation the strand 102 becomes disconnected from the slot 100 by normal movement of the snared animal; the other end of filament line 102 being connected to a remote staking element 104 as illustrated in FIG. 1. In this manner damage is not imparted to the specific trigger mechanism by the entrapment and tussle of an animal. Since the loop snaring of animals is a very humane technique for the trapping of rodents and the like, it is more common for such traps to be damaged by the movement of the animals as compared to such traps that maim or kill such animals.

It is thus believed that the operation and construction of the present invention will be apparent from the foregoing description. While the apparatus as shown and described has been characterized as being preferred it will be obvious that various changes and modifications may made therein without departing from the spirit and scope of the invention as defined in the following claims.

What is claimed is:

1. An animal trap apparatus of the type including a filament snare being spring actuated to ensnare the animal in the vicinity of bait disposed relative thereto, wherein the apparatus contains:
   a trigger mechanism having a snaring lever arm pivoted for movement in response to the detection of an animal;
   spring means biasing said trigger mechanism for responsive movement in conjunction with a filament snare;
   latch means maintaining said biased trigger mechanism in a loaded condition;
   means connecting said filament snare to said trigger mechanism for movement in reaction to said latch means and for permitting said filament snare to be disengaged therefrom after the actuation of said trigger;
   solenoid means disposed adjacent said latch means for actuating said latch to permit said spring to activate said lever arm for engaging the animal relative thereto;
   electrical sensor means disposed adjacent said snare for detecting the presence of an animal in position for ensnarement; and
   means for supplying electric power to said solenoid means and said sensor means for the actuation of said trigger mechanism.

2. The apparatus as set forth in claim 1 wherein a plurality of snare filaments are connected to said trigger mechanism in conjunction with a plurality of electrical sensors disposed adjacent the filament snares for detecting the presence of an animal in position to be ensnared by the filament snare.

3. The apparatus as set forth in claim 1 wherein said filament snare is looped over said lever arm for actuation in response to the detection of an animal in the vicinity thereof said filament snare being looped over said lever arm for disengagement from said lever arm to prevent damage to said apparatus in the snaring of an animal, and wherein said filament snare includes a second end secured adjacent said apparatus.

4. The apparatus as set forth in claim 1 wherein said latch means includes a bracket engaging a finger of a depending arm of the trigger mechanism confining said finger from upwardly biased movement in response to actuation of said solenoid means.

5. The apparatus as set forth in claim 1 wherein said trigger mechanism snaring a spring biased T-bar structure including a first generally horizontal lever arm pivotally supported in a generally central portion thereof by an upstanding support member, said horizontal arm having a first end attached to a tension spring and a second opposite end constructed for upward pivotal movement in response to the release of said latch means and having said filament snares looped thereover for the snaring of the detected animal.

6. The apparatus as set forth in claim 1 wherein said sensor means are comprised of a single pole, single throw switch constructed for actuation under light pressure whereby animals of a relatively small size may be detected by said switch.

7. The apparatus of said claim 1 wherein said power means includes a battery for powering said solenoid in response to detection of an animal adjacent a filament snare.

8. The apparatus as set forth in claim 1 wherein said latch means includes a sensor lever arm connected by a sensing filament to a bait disposed in the vicinity of said filament snare for mechanically actuating said trigger mechanism in conjunction with said electrical sensor means.

9. The apparatus as set forth in claim 1 wherein said trigger mechanism comprises a spring biased T-bar structure having a first generally horizontal snaring lever arm pivotally supported in a generally central portion thereof by an upstanding support member, said horizontal arm having a first end attached to a tension spring and a second opposite end constructed for upward pivotal movement and having a notched portion receiving a plurality of filament snares thereover in conjunction with a plurality of electrical sensor disposed adjacent the filament snares for detecting the presence of an animal in position to be ensnared thereby, and wherein said trigger mechanism includes a filament actuated sensor lever having one end of said filament secured to said lever for the mechanical actuation of said trigger in conjunction with the electrical actuation thereof.

* * * * *